UNITED STATES PATENT OFFICE.

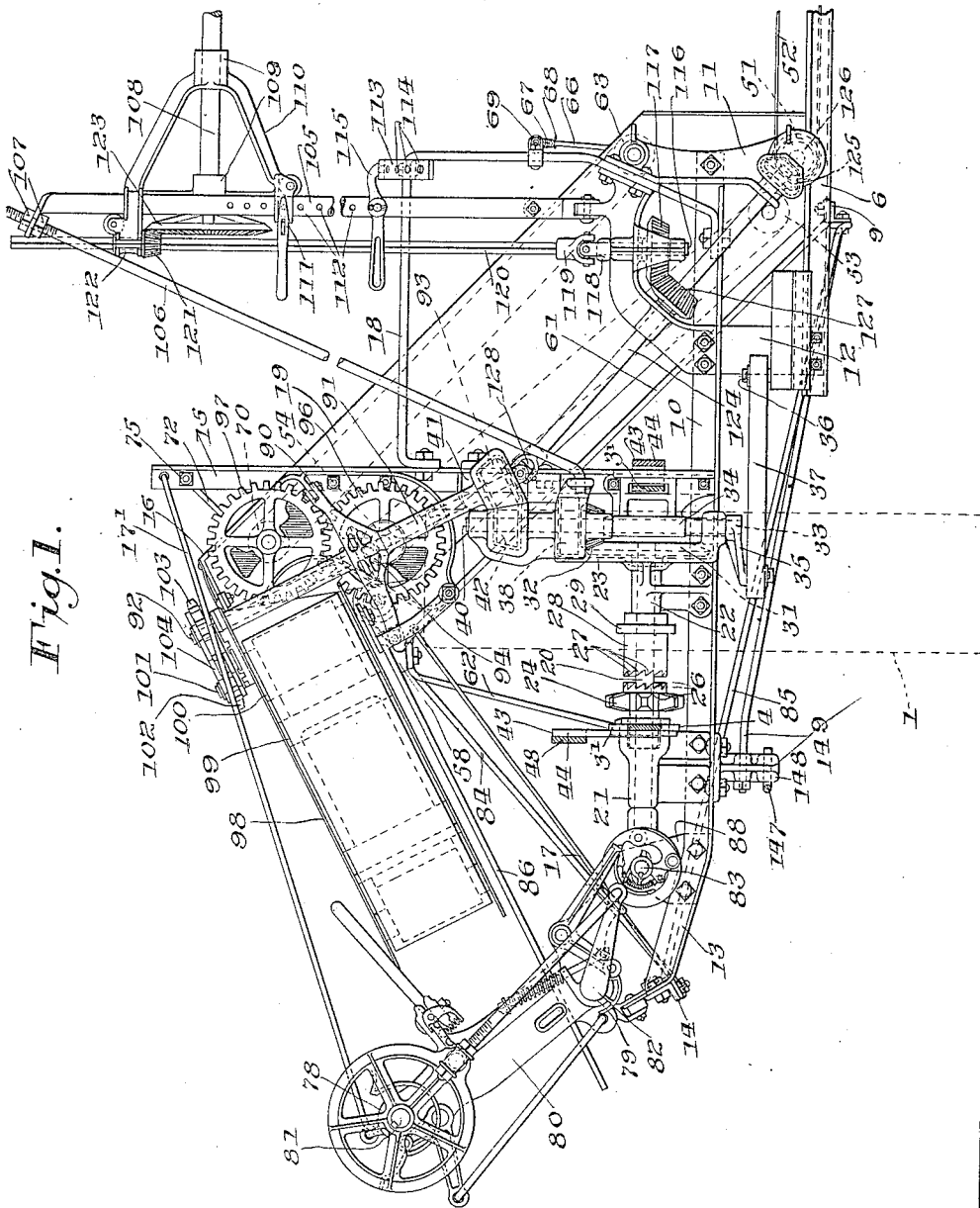

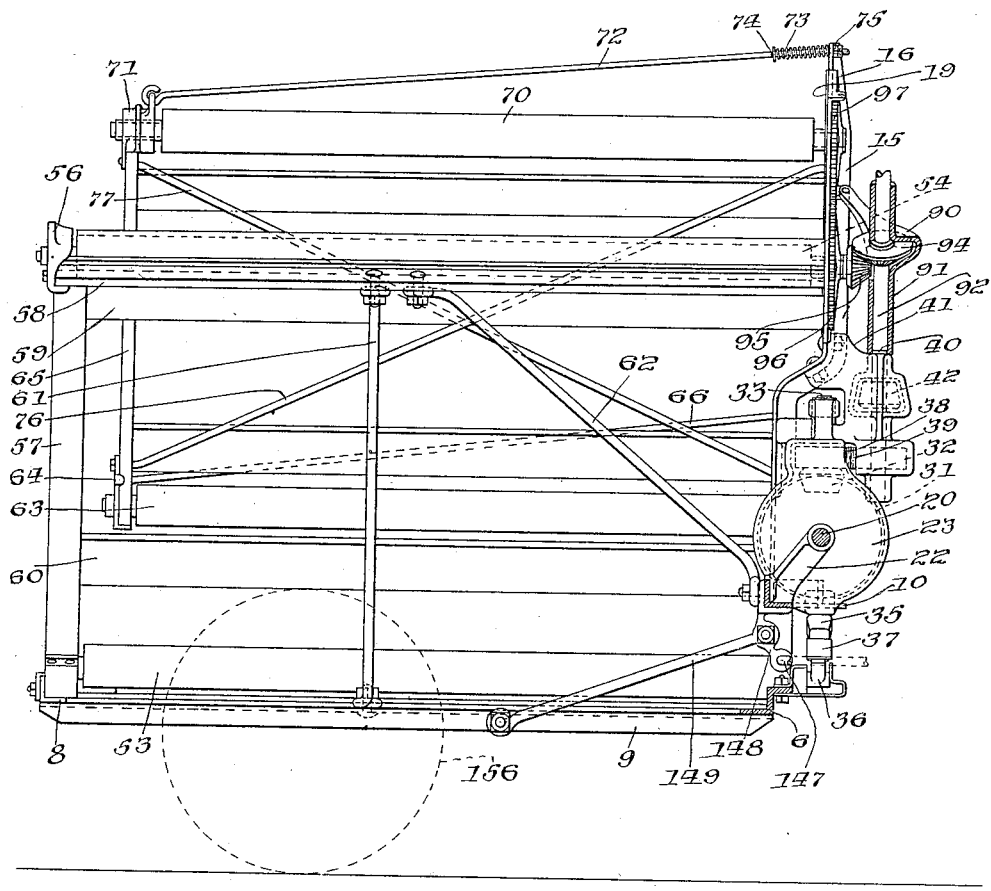

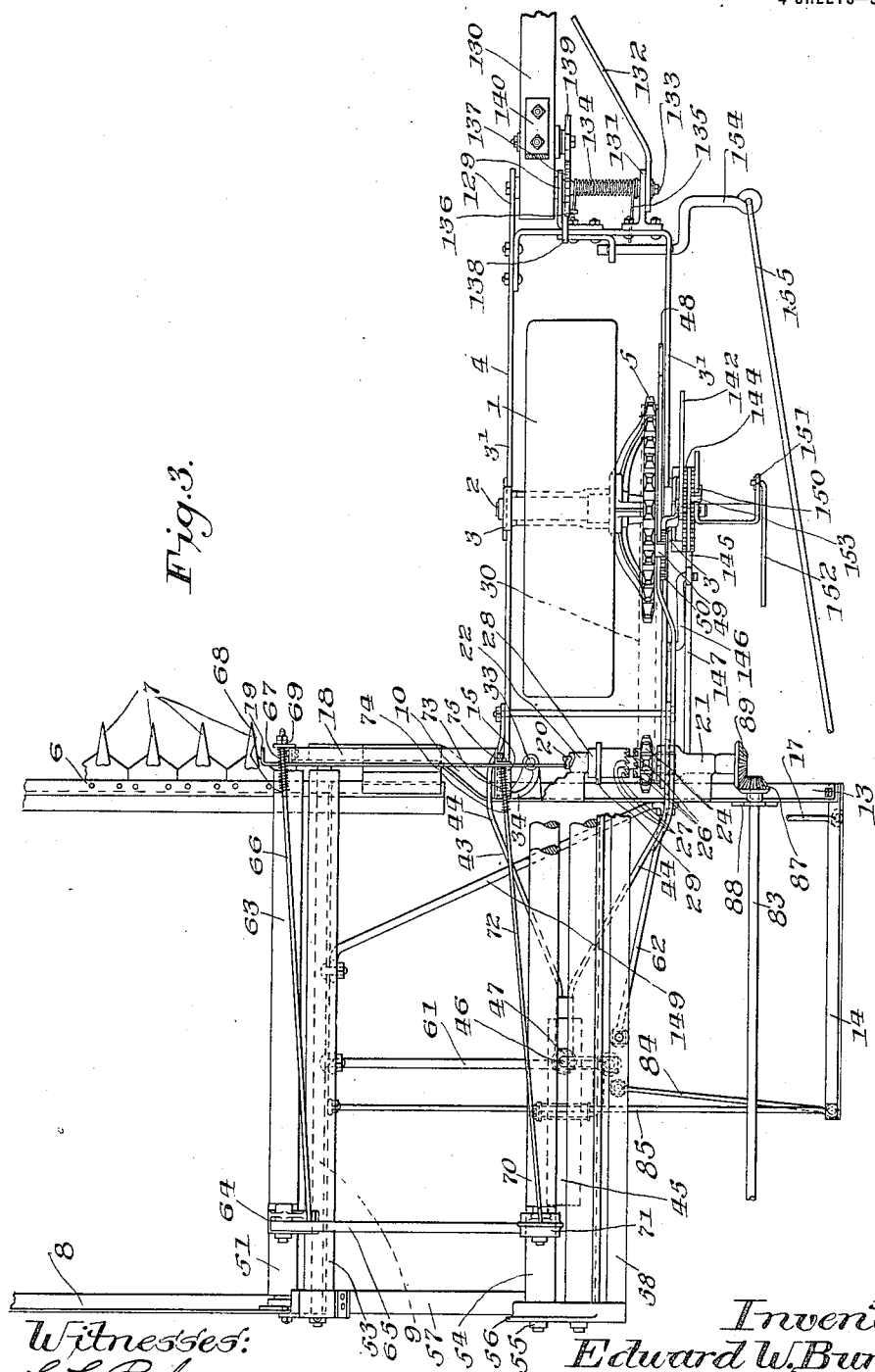

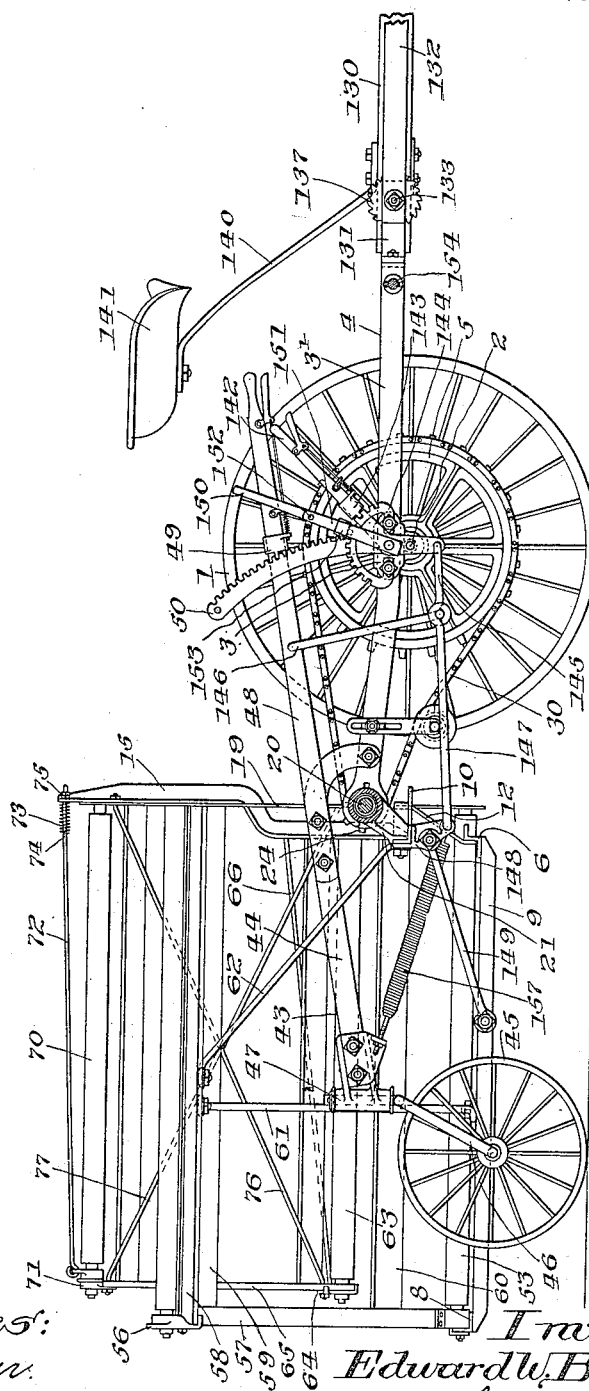

EDWARD W. BURGESS, OF CHICAGO, ILLINOIS, ASSIGNOR TO INTERNATIONAL HARVESTER COMPANY OF NEW JERSEY, A CORPORATION OF NEW JERSEY.

GRAIN HARVESTER AND BINDER.

1,204,403.

Specification of Letters Patent.   Patented Nov. 14, 1916.

Application filed December 26, 1914.   Serial No. 879,075.

*To all whom it may concern:*

Be it known that I, EDWARD W. BURGESS, a citizen of the United States, residing at Chicago, in the county of Cook and State of Illinois, have invented certain new and useful Improvements in Grain Harvesters and Binders, of which the following is a full, clear, and exact specification.

This invention relates to grain harvesters and binders, its object being to provide a machine of the class indicated that will be relatively light both in weight and draft, permitting an easy and rapid adjustment of its plane of operation; to provide a power transmitting mechanism between the traction wheel and other operative parts of the harvester that will be direct and positive, with but little loss of power from friction; to eliminate side draft; to provide a frame structure that is light and strong and easily and quickly assembled, and a complete and efficient machine that may be operated at a cost materially less than those of accepted standard. These objects are attained by means of the mechanism illustrated in the accompanying drawings, in which—

Figure 1 is a front elevation of part of a grain harvester illustrating improved mechanism for transmitting motion to its operative parts; Fig. 2 is a partial side elevation of Fig. 1; Fig. 3 is a top plan view of the wheel frame and part of the elevator structure, and a portion of the grain platform; and Fig. 4 is a side elevation of Fig. 3.

Referring to the drawings, wherein the same reference characters designate like parts throughout the several views, 1 represents a traction wheel journaled upon a transverse shaft 2, having its opposite ends secured in hangers 3 that are secured to the side members $3^1$ of a U-shaped wheel frame 4 intermediate its ends, and 5 represents a sprocket wheel rotatable with the traction wheel.

The grain platform includes a front frame member 6 forming the cutter bar, having guard fingers 7 secured thereto, a rear frame member 8, and a longitudinally disposed frame member 9 at the inner end of the platform, having its opposite ends secured to the frame members 6 and 8.

10 represents an elevator frame member extending stubbleward from the cutter bar in a plane above it, having its grainward end connected therewith by means of a bracket member 11 and a depending hanger 12, and its upturned stubbleward end 13 secured to a binder supporting rail 14.

15 represents a vertically disposed frame member having its lower end secured to the frame member 10, 16 a bracket secured to its upper end, 17 a frame member connecting the bracket with the binder supporting rail, and $17^1$ a radius bar connecting the upper end of the elevator frame with the upper end of the binder frame.

18 represents a frame member having one end secured to the vertical member 15 and extending grainward parallel with the grain platform, then turned down and secured to the bracket member 11 and frame member 10.

19 represents a frame sheet having its lower end secured to the bracket 11 and inclined upward and stubbleward is secured at its upper end to the vertical member 15 and bracket 16.

20 represents a transversely disposed shaft journaled at its stubbleward end in a bearing member 21 secured to the frame member 10, and at its opposite end in a combined bearing 22 and gear case 23 secured to the frame members 10 and 15. The shaft 20 derives motion from the traction wheel by means including a sprocket wheel 24 loosely journaled upon the shaft and provided with clutch teeth 26 that are adapted to engage with supplemental clutch teeth 27 upon a clutch sleeve 28 slidably mounted upon the shaft, having a clutch controlling flange 29 thereon that may be engaged by a clutch tripping lever in a manner to cause the shaft to turn with the sprocket wheel 24 through the intermediacy of a sprocket chain 30 and connecting the sprocket wheels 24 and 5, or to be disconnected at the will of the operator in any desired manner.

31 represents a bevel gear secured to the grainward end of the shaft 20 and meshing with a bevel pinion 32 secured to the upper end of a vertically disposed shaft 33 journaled in a sleeve member 34 carried by the frame member 15, and 35 represents a crank arm secured to the lower end of the shaft and connected with a knife head 36 by means of a pitman 37 whereby the usual reciprocating movement is transmitted to the cutting apparatus as represented by the knife head. Preferably integral with the pinion 32 is a spur pinion 38 that meshes with a corresponding pinion 39 secured to the lower end of a short vertically disposed shaft 40 journaled in a bracket member 41 secured to the frame member 15, and 42 represents a bevel pinion secured to the upper end of the shaft. The rear ends of the side members 3¹ of the wheel frame 4 are pivotally connected with the harvester elevator frame coaxially with the transverse shaft 20 in a manner to cause the shaft 20 to move concentrically with the axis of the traction wheel as the machine is raised or lowered and not affect the operation of the driving connections.

43 represents a trailing wheel frame including rearwardly converging bars 44 having their front ends pivotally connected with the rear ends of the side members of the wheel frame, and 45 represents a caster wheel journaled upon a supporting arm 46 that is journaled at its upper end in a sleeve 47 secured to the rear ends of the converging bars 44.

48 represents a lever arm having its rear end secured to one of the bars 44 of the trailing frame and extending forward at one side of the traction wheel and carrying a detent mechanism 49 that operatively engages with a toothed sector bar 50 free to turn about the axis of the traction wheel, whereby the trailing frame may be secured in any desired position by a vibratable movement thereof about the axis of the pivotal connection of the traction wheel frame and the harvester, the degree of flexure of the wheel frame controlling the operative distance of the cutting apparatus from the ground.

51 represents an endless carrier roller at the inner end of the grain platform, and 52 an endless carrier apron.

53 represents the lower roller of the lower elevator carrier, having its front end journaled in a bearing carried by the bracket 11 and frame sheet 19, and its rear end in a bearing carried by the rear platform frame member 8.

54 represents the upper roller of the lower elevator carrier having its front end journaled in a bearing carried by the bracket member 16 and the upper end of the frame sheet 19, and its rear end in a bearing 55 carried by a bracket 56 secured to the upper end of an inclined elevator frame member 57, having its lower end secured to the rear frame member 8 of the grain platform.

58 represents a longitudinally disposed elevator frame member at the upper end of the lower elevator, having its front end secured to the bracket member 16 stubbleward from the axis of the roller 54 and its rear end to the bracket 56.

59 and 60 represent upper and lower frame members of the elevator, respectively, having their rear ends secured to the inclined frame member 57 and their front ends to the frame sheet 19.

61 represents an inclined strut member having its upper end secured to the frame member 58 intermediate its ends and its lower end to the grain platform frame member 9, and 62 represents an inclined strut having its upper rear end secured to the frame member 58 intermediate its ends and its lower front end to the elevator frame member 10, the parts of the frame structure being disposed in a manner to form a light and very strong and rigid support for the lower elevator and the inner end of the grain platform.

63 represents the lower roller of the upper elevator, having its front end journaled in a bearing carried by the bracket 11 and its rear end in a bearing carried by a bracket 64 secured to the lower end of an inclined elevator frame member 65, and 66 represents a tension rod having its rear end connected with the lower end of the frame member 65 and inclined forward and upward has its front end slidably connected with the frame member 18 above the axis of the roller 63, and 67 represents a compression spring interposed between the member 18 and a pin 68 carried by the rod, the spring permitting a floating action of the rear end of the elevator carrier upon the stream of grain delivered by the grain platform carrier, and a nut 69 threaded upon the end of the tension rod permits a regulation of the distance between the elevator carriers at the rear thereof when the machine is operating in light grain, the carrier automatically adapting itself to the varying bulk of grain as it is elevated.

70 represents the upper roller of the upper elevator, having its front end journaled in a bearing carried by the bracket 16 and its rear end in a bearing carried by a bracket 71 secured to the upper end of the frame member 65, and 72 represents a tension rod having its rear end flexibly connected with the bracket 71 and its front end slidably connected with the upper end of the vertically disposed elevator frame member 15 above the axis of the roller, and 73 represents a compression spring carried by the rod and interposed between the member 15 and a pin 74 in the rod and operative in the same manner as the spring 67 to yieldingly resist an upward movement of the rear end of the roller in the operation of the carrier, a nut 75 being threaded upon the end of the rod and operative to limit a downward swing of the rear end of the roller.

76 and 77 represent diagonally disposed truss rods crossing each other at their middle and having their rear ends secured to the frame-member 65 and their front ends to the front of the elevator frame and operative to maintain the carrier rollers 63 and 70 in parallel relation.

The binder attachment includes the usual U-shaped frame having upper and lower tubular arms 78 and 79, respectively, extending rearwardly and connected at their front with the head 80, the knotter operating shaft 81 being journaled in the upper arm and the needle operating shaft 82 in the lower arm, and 83 represents the packer shaft carried by the binder frame and adapted to transmit motion to the remaining parts of the mechanism in any of the well-known ways. The binder is movable fore and aft of the machine upon the supporting rail 14, that is secured at its front end to the frame member 10 and having its rear end supported by means of a tension rod 84 connecting it with the elevator frame member 58 and the grainwardly inclined strut member 85 connecting it with the platform frame member 9, the rod and strut being disposed in a vertical plane in the rear of the operative path of the packers when the binder attachment is adjusted rearward to its limit of movement.

86 represents the inclined deck of the grain binder attachment, having its lower stubbleward end secured to the binder frame and its upper grainward end slidably supported upon the elevator frame member 58.

87 represents a bevel pinion through which the packer shaft 83 slides as the binder is adjusted in a fore and aft direction, the pinion being held against movement with the binder by means of a plate 88 secured to the frame member 10. The pinion meshes with a bevel pinion 89 secured to the transversely disposed shaft 20 whereby the packer shaft and other operative parts of the binder mechanism are driven directly by the power shaft 20, that is directly connected with the traction wheel by means of the sprocket chain 30.

90 represents a bracket member secured to the bracket 16 and having a diagonally disposed sleeve 91 in which is journaled a shaft 92, having secured to its lower end a pinion 93 that meshes with the pinion 42 upon the shaft 40.

94 represents a bevel pinion secured to the shaft 92 and meshing with a corresponding pinion 95 secured to the extended end of the journal of the carrier roller 54, and 96 represents a spur gear that may be integral with the pinion 95 and which meshes with a spur gear 97 secured to an extension of the carrier roller 70, whereby motion is properly transmitted to the upper elevator carrier.

98 represents a common form of butt adjuster including a frame 99 vibratable about the axis of its driving roller 100, that is secured to a shaft 101 parallel with the shaft 92 and journaled in bearings carried by the frame, and 102 represents a sprocket wheel secured to the upper end of the shaft and operatively connected with a corresponding sprocket wheel 103 secured to the upper end of the shaft 92 by means of a sprocket chain 104.

The harvester reel includes a vertically disposed reel supporting member 105, having its lower end pivotally connected with the bracket 11, and 106 represents a diagonally disposed tension rod having its lower end spaced apart stubbleward from the lower end of the reel supporting member 105 and pivotally connected with the elevator frame coaxially with the pivotal connection of said reel supporting member, the upper end of the tension rod being adjustably connected with the upper end of the member 105 by means of securing nuts 107. 108 represents the reel shaft journaled in bearings 109 forming part of the yoke 110 slidably mounted upon the member 105 and secured in any desired position of adjustment vertically by means of a detent member 111 adapted to engage with any of a series of openings 112 in the member 105.

113 represents a curved bar secured to the frame member 18, formed concentric with the axis of the member 105 and provided with a series of openings 114 that may selectively receive one end of a swinging detent lever 115 carried by the member 105, the opposite end of the lever forming a hand piece whereby the lever may be manipulated to adjust the reel in a fore and aft direction.

The motion transmitting mechanism for the reel includes a short vertically disposed shaft 116 journaled in a bearing carried by the bracket 11, having a bevel pinion 117 secured to its lower end and a universal coupling member 118 to its upper end whereby it is operatively connected with a corresponding coupling member 119 secured to the lower end of an angular shaft 120 that is slidably received at its upper end by an axial opening in a bevel pinion 121 that is journaled in a bearing 122 carried by the yoke 110, the pinion engaging with a bevel wheel 123 secured to the reel shaft 108 and sliding upon the shaft 120 as the reel is raised or lowered.

124 represents a diagonally disposed shaft journaled in bearings carried by the bracket 11 and having secured to its lower end a bevel pinion 125 that engages with a corresponding pinion 126 secured to an extension of the journal of the platform carrier roller 51, and to its middle part a pinion 127 that meshes with the pinion 117, and the upper end of the shaft 124 is operatively connected with the lower end of the shaft 92 by means of a universal coupling mechanism 128.

The front end of the traction wheel frame is provided with draft bracket members 129 at one side thereof that receive the rear end of a draft tongue 130 between them, and upon its opposite side with a single bracket 131, and 132 represents a tongue brace having its front end secured to the side of the tongue and its rear laterally inclined end overlapping the bracket 131.

133 represents a pivot bolt securing the tongue and brace with the draft bracket members, and 134 represents a coiled torsional counterbalancing spring carried by the body of the pivot bolt, having one end 135 turned laterally and engaging with the front of the wheel frame, and its opposite end engaging with a laterally extending lug 136 upon a ratchet wheel 137 journaled upon the pivot bolt 133, and 138 represents a gravity holding pawl pivotally mounted upon the wheel frame and meshing with the ratchet wheel in a manner to cause the reactive force of the spring 134 to counterbalance the entire weight of the draft tongue, whiffletrees, neckyoke and other parts. The means for regulating the force of the spring include a gravity pawl 139 pivotally mounted upon the draft tongue in front of the ratchet wheel and free to engage therewith. To increase the tension upon the spring the front end of the tongue is raised sufficient to cause the pawl 139 to pass from one tooth to another upon the ratchet wheel 137, and then the tongue is lowered, thereby turning the ratchet wheel in a forward direction to wind the spring about the pivot bolt. The pawl 138 engages with the ratchet wheel and retains it in its adjusted position, the operation being repeated until a desired tension of the spring has been secured.

140 represents a seat supporting spring carried by the draft tongue, and 141 an operator's seat mounted thereon.

142 represents a tilting lever pivotally mounted intermediate its ends upon the wheel frame and convenient to the hand of the operator, and carrying a detent mechanism 143 that coöperates with a toothed sector 144 in a common way to retain the lever in any desired position of adjustment, the lower end of the lever being pivotally connected with the front end of a link 145 that has its rear end connected with the lever arm 48 of the trailing wheel frame 43 by means of a vertically disposed link 146, and 147 represents a link having its front end pivotally connected with the lower end of the link 146, preferably coaxially with the link 145, and its rear end with a depending bracket member 148 secured to the elevator frame member 10, and 149 represents a diagonally disposed tension brace member connecting the bracket with the platform frame member 9. The links 145 and 147 form a toggle draft connection between the traction wheel frame and the frame of the elevator below the axis of their pivotal connection, and by adjusting the tilting lever 142 the operative angle of the grain platform may be regulated as desired within the limit of movement of the adjusting mechanism. When the platform is adjusted to a higher or lower plane by means of the lever arm 48 and the trailing wheel frame 43, the link 146 produces a flexure of the toggle links 145 and 147, and the associated parts of the mechanism are so proportioned that the degree of flexure will maintain the grain platform in substantially the same operative inclination as it is raised or lowered.

150 represents a binder shifting lever pivoted upon the traction wheel frame coaxially with the tilting lever 142, and turned laterally stubbleward and provided with a vertically disposed arm 151 arranged in a plane in line with the binder supporting rail 14, and 152 represents a link that may connect the arm 151 with the binder attachment. The lever 150 is provided with a detent mechanism 153 that coöperates with the sector 144 in a manner to retain the binder attachment in any desired position of adjustment in a fore and aft direction.

154 represents a foot lever pivotally mounted upon the front of the wheel frame and designed to be connected with a sheaf carrier by means of a tension link 155. The position of the grain wheel 156 is indicated by dotted lines in Fig. 2, and any approved means may be used for connecting it with the grainward end of the grain platform.

157 represents a counterbalancing spring connecting the rear end of the trailing frame 43 with the lower part of the elevator frame and operative to counterbalance the weight supported by the lever arm 48, enabling the operator to readily adjust the grain platform in varying planes. The position fore and aft of the caster wheel carried by the trailing frame is such as to permit it to turn on its vertical pivot when the machine is turned laterally and not engage the binder mechanism or the frame of the machine, and its position in a grainward direction is such as to permit sufficient weight to be carried by the grain wheel to maintain the machine in proper balance when operating upon a side hill. The trailing caster wheel carries sufficient weight to counteract any side draft of the machine, and the remainder of the weight is carried by the traction wheel. The front of the elevator frame is relatively light, and the arrangement of its associated parts is such as to permit it to carry the load in a satisfactory manner, and, being connected with the middle of the trailing frame extending in a longitudinal direction, and having one end supported directly over the axis of the traction wheel and its opposite end by the caster wheel, the distribution of weight is such as to permit the use of a relatively light traction wheel frame. The weight of the operator and the draft tongue substantially neutralize the weight in rear of the axis of the traction wheel not carried by the caster and grain wheels.

Having shown and described one embodiment of my invention, I do not desire that it be confined to the particular form illustrated, it being understood that many changes may be made both in the arrangement and proportion of parts without departing from the spirit of my invention.

What I claim as my invention, and desire to secure by Letters Patent, is:

1. A harvester including, in combination, a wheel frame, a traction wheel journaled therein, a grain platform and a grain elevator frame transversely disposed in rear of said traction wheel and pivotally connected with the rear end of said wheel frame, a rearwardly extending arm movable about the rear end of said wheel frame, a caster wheel connected with the rear end of said arm, and means for adjusting said arm to raise or lower said grain platform and elevator bodily.

2. A harvester including, in combination, a wheel frame, a traction wheel journaled therein, a grain platform and elevator transversely disposed in rear of said traction wheel and pivotally connected with the rear end of said wheel frame, a longitudinally disposed adjusting lever vibratable about the rear end of said wheel frame, a trailing wheel frame carried by the rear end of said lever, and means for controlling the position of said lever in a manner to raise or lower said grain platform and elevator bodily relative to said traction wheel.

3. A harvester including, in combination, a wheel frame, a traction wheel journaled therein, a grain platform and elevator transversely disposed in rear of said traction wheel and pivotally connected with the rear end of said wheel frame, a longitudinally disposed adjusting lever vibratable vertically upon the rear end of said wheel frame, a caster wheel carried by the rear end of said lever, means for controlling the position of said lever, in a manner to raise or lower said grain platform and elevator bodily relative to said traction wheel, and independent means for tilting said platform and elevator about said pivotal connection.

4. A harvester including, in combination, a wheel frame, a traction wheel journaled therein, a grain platform and elevator transversely disposed in rear of said traction wheel and pivotally connected with the rear end of said wheel frame, a trailing wheel frame vibratable about the rear end of said wheel frame and operative to control the adjustment of said grain platform and elevator to a higher or lower plane, and independent means for controlling a tilting movement of said platform and elevator relative to said wheel frame.

5. A harvester including, in combination, a wheel frame, a traction wheel journaled therein, a grain platform and elevator transversely disposed and pivotally connected with the rear end of said wheel frame, a trailing wheel frame vibratable about the rear end of said wheel frame and operative to control the adjustment of said grain platform and elevator to a higher or lower plane, a toggle link connection between said wheel frame and said platform below the axis of said pivotal connection, and a link connection between said toggle connection and said trailing wheel frame.

6. A harvester including, in combination, a wheel frame, a traction wheel journaled therein, a grain platform and elevator transversely disposed and pivotally connected with the rear end of said wheel frame, a trailing wheel frame vibratable about the rear end of said wheel frame and operative to control the adjustment of said grain platform to a higher or lower plane, and means controlled by said trailing frame for maintaining a predetermined angularity of adjustment of said platform relative to the axis of said traction wheel.

7. A harvester including, in combination, a wheel frame, a traction wheel journaled therein, a grain platform and elevator disposed transversely and pivotally connected with the rear end of said wheel frame, a trailing wheel frame longitudinally disposed and pivoted intermediate its ends upon the rear end of said wheel frame, a caster wheel journaled upon the rear end of said trailing frame, said trailing frame being adjustably connected with said wheel frame, a tilting lever pivoted upon said wheel frame, a toggle connection between said lever and said grain platform, and a link connection between said toggle and the front sections of said trailing frame whereby the movement of the toggle connection is controlled.

8. A harvester including, in combination, a wheel frame, a traction wheel journaled in bearings carried by said wheel frame, a grain platform and elevator transversely disposed and pivotally connected with the rear end of said wheel frame, a trailing frame longitudinally disposed and pivoted intermediate its ends upon the rear end of said wheel frame, a caster wheel journaled upon the rear end of said trailing frame, a transverse shaft journaled upon said elevator coaxially with its pivotal connection with said wheel frame, gear connections between said shaft and said traction wheel, cutting apparatus carried by said grain platform, and a vertically disposed shaft journaled upon said elevator and operatively connected with said transverse shaft and with said cutting apparatus.

9. A harvester including, in combination, a wheel frame, a traction wheel journaled in bearings carried by said wheel frame, a grain platform and elevator transversely disposed and pivotally connected with the rear end of said wheel frame, a trailing frame longitudinally disposed and pivoted intermediate its ends upon the rear end of said wheel frame, a caster wheel journaled upon the rear end of said trailing frame, a transverse shaft journaled upon the machine and operatively connected with said traction wheel, a binder attachment including a longitudinally disposed packer driving shaft, and driving gear connections between said transverse shaft and said packer driving shaft.

10. A harvester including, in combination, a wheel frame, a traction wheel journaled in bearings carried by said wheel frame, a grain platform and elevator transversely disposed and pivotally connected with the rear end of said wheel frame, a trailing frame longitudinally disposed and pivoted intermediate its ends upon the rear end of said wheel frame, a caster wheel journaled upon the rear end of said trailing frame, a transverse shaft journaled upon the machine coaxially with said pivotal connection, a binder attachment including a packer driving shaft and cutting apparatus carried by said grain platform, a vertically disposed shaft having gear connections with said transverse shaft and operatively connected with said cutting apparatus, and direct gear connections between said packer driving shaft and said transverse shaft.

11. A harvester including, in combination, a wheel frame, a traction wheel journaled in bearings carried by said wheel frame, a grain platform and elevator including grain advancing elements carried thereon transversely disposed and pivotally connected with the rear end of said wheel frame, a trailing frame longitudinally disposed and pivoted intermediate its ends upon the rear end of said wheel frame, a caster wheel journaled upon the rear end of said trailing frame, a transverse shaft journaled upon the machine coaxially with said pivotal connection, cutting apparatus carried by said grain platform, and a vertically disposed shaft having gear connections with said transverse shaft and with said cutting apparatus and said grain advancing elements.

12. A harvester including, in combination, a wheel frame, a traction wheel journaled upon said wheel frame, a grain platform and elevator including grain advancing elements and a reel carried thereon, said elevator and platform being disposed transversely and pivotally connected with the rear end of said wheel frame, a tilting frame longitudinally disposed and pivoted intermediate its ends upon the rear end of said wheel frame, a caster wheel journaled upon the rear end of said trailing frame, a transverse shaft journaled upon the machine coaxially with said pivotal connection and operatively connected with said traction wheel, cutting apparatus carried by said grain platform, a vertically disposed shaft having gear connections with said transverse shaft and with said cutting apparatus, and a second vertically disposed shaft having gear connections with said transverse shaft and with said grain advancing elements and said reel.

13. A harvester including, in combination, a wheel frame, a traction wheel journaled upon said frame, a grain platform and elevator including grain carrying elements, a binder attachment including a packer driving shaft carried by said elevator and platform, a reel carried by said elevator and platform, said elevator and platform being disposed transversely of and pivotally connected with the rear end of said wheel frame, a longitudinally disposed trailing frame pivoted intermediate its ends upon the rear end of said wheel frame, a caster wheel journaled upon the rear end of said trailing frame, a transverse shaft journaled upon the machine coaxially with said pivotal connection and operatively connected with said traction wheel, cutting apparatus carried by said grain platform, a vertically disposed shaft having gear connections with said transverse shaft and with said cutting apparatus, and a second vertically disposed shaft having gear connection with said reel and grain advancing elements, said packer driving shaft being directly driven by said transverse shaft.

14. A harvester including, in combination, a wheel frame, a traction wheel journaled upon said frame, a grain platform and elevator including grain carrying elements, said elevator and grain platform being disposed transversely of and pivotally connected with the rear end of said wheel frame, a longitudinally disposed trailing frame pivoted intermediate its ends upon the rear end of said wheel frame, a caster wheel journaled upon the rear end of said trailing frame, said grain carrying elements including endless carrier rollers extending rearward at the upper end of the elevator and spaced apart vertically, the upper roller overhanging and supported from the front of the machine, and the lower roller supported by means of a brace member extending downward and forward to the elevator frame.

In testimony whereof I affix my signature, in the presence of two witnesses.

EDWARD W. BURGESS.

Witnesses:
F. W. HOFFMEISTER,
C. C. PALMER.

Copies of this patent may be obtained for five cents each, by addressing the "Commissioner of Patents, Washington, D. C."